United States Patent
Li et al.

(10) Patent No.: US 10,624,001 B2
(45) Date of Patent: Apr. 14, 2020

(54) PROSE RELAY RESOURCE OPTIMIZATION

(71) Applicant: TELEFONAKTIEBOLAGET LM ERICSSON (PUBL), Stockholm (SE)

(72) Inventors: Yunxi Li, Järfälla (SE); Stefan Wänstedt, Luleå (SE); Eric Andersson, Järfälla (SE); Marco Belleschi, Solna (SE); Henrik Enbuske, Stockholm (SE); Mats Folke, Vällingby (SE); Qianxi Lu, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/753,821

(22) PCT Filed: Aug. 19, 2016

(86) PCT No.: PCT/IB2016/054985
§ 371 (c)(1),
(2) Date: Feb. 20, 2018

(87) PCT Pub. No.: WO2017/029645
PCT Pub. Date: Feb. 23, 2017

(65) Prior Publication Data
US 2019/0014506 A1    Jan. 10, 2019

(30) Foreign Application Priority Data
Aug. 20, 2015  (WO) ................ PCT/CN2015/087626

(51) Int. Cl.
*H04W 28/26* (2009.01)
*H04W 72/14* (2009.01)
(Continued)

(52) U.S. Cl.
CPC ............ *H04W 28/26* (2013.01); *G06F 21/55* (2013.01); *H04L 5/0064* (2013.01); *H04W 4/70* (2018.02);
(Continued)

(58) Field of Classification Search
CPC ...... H04W 28/26; H04W 72/14; H04W 76/14
See application file for complete search history.

(56) References Cited

U.S. PATENT DOCUMENTS

2008/0316954 A1* 12/2008 Zheng .................. H04B 7/2606
370/315
2011/0250980 A1* 10/2011 Johansen ........... A63B 69/3676
473/219
(Continued)

FOREIGN PATENT DOCUMENTS

| WO | 2011019770 A1 | 2/2011 |
|---|---|---|
| WO | 2015050403 A1 | 4/2015 |

OTHER PUBLICATIONS

Samsung; "Resource Allocation Aspects for UE-to-Network Relay"; 3GPP TSG RAN WG2 Meeting #90 Fukuoka, Japan, May 25-29, 2015; R2-152149 (Year: 2015).*
(Continued)

*Primary Examiner* — Gary Mui
(74) *Attorney, Agent, or Firm* — Sage Patent Group

(57) ABSTRACT

According to some embodiments, a method in a first wireless device of relaying data from a second wireless device to a wireless communication network comprises: obtaining data transmission pattern information associated with data to be relayed from the second wireless device to the wireless communication network; requesting resources from the wireless communication network according to the data transmission pattern information; receiving an indication of resources from the wireless communication network; receiving the data from the second wireless device; and transmit-
(Continued)

ting the data to the wireless communication network using the indicated resources. In particular embodiments, obtaining the data transmission pattern information comprises receiving the data transmission pattern information from the second wireless device; determining the data transmission pattern based on a service type or protocol associated with the data to be relayed; or determining the data transmission pattern based on a LTE version supported by the second wireless device.

19 Claims, 10 Drawing Sheets

(51) Int. Cl.
  *H04W 76/14*   (2018.01)
  *G06F 21/55*   (2013.01)
  *H04L 5/00*    (2006.01)
  *H04W 4/70*    (2018.01)
  *H04W 8/00*    (2009.01)
  *H04W 88/04*   (2009.01)
  *H04B 7/155*   (2006.01)
  *H04W 92/18*   (2009.01)

(52) U.S. Cl.
  CPC ......... *H04W 8/005* (2013.01); *H04W 72/14* (2013.01); *H04W 76/14* (2018.02); *H04B 7/15542* (2013.01); *H04W 88/04* (2013.01); *H04W 92/18* (2013.01)

(56) References Cited

U.S. PATENT DOCUMENTS

| | | | | |
|---|---|---|---|---|
| 2013/0194919 A1* | 8/2013 | Garavaglia | ....... | H04W 28/0268 370/229 |
| 2014/0226477 A1* | 8/2014 | Xie | ....... | H04L 47/805 370/234 |
| 2014/0328329 A1 | 11/2014 | Novlan et al. | | |
| 2015/0327315 A1* | 11/2015 | Xue | ....... | H04L 5/0044 370/330 |
| 2016/0044669 A1* | 2/2016 | Yoon | ....... | H04W 76/14 370/336 |
| 2016/0044729 A1* | 2/2016 | Tu | ....... | H04W 74/04 370/329 |
| 2016/0219634 A1* | 7/2016 | Lu | ....... | H04W 72/0406 |
| 2016/0249355 A1* | 8/2016 | Chae | ....... | H04W 72/1263 |
| 2016/0381672 A1* | 12/2016 | Kim | ....... | H04W 72/048 370/329 |
| 2017/0215187 A1* | 7/2017 | Panteleev | ....... | H04W 72/1278 |
| 2017/0325243 A1* | 11/2017 | Yasukawa | ....... | H04W 48/08 |
| 2017/0366995 A1* | 12/2017 | Jung | ....... | H04W 24/10 |
| 2018/0035308 A1* | 2/2018 | Nguyen | ....... | H04W 76/14 |
| 2018/0035354 A1* | 2/2018 | Martin | ....... | H04W 40/12 |
| 2018/0124621 A1* | 5/2018 | Jung | ....... | H04W 24/10 |
| 2018/0146494 A1* | 5/2018 | Khoryaev | ....... | H04W 76/14 |
| 2018/0152915 A1* | 5/2018 | Kalhan | ....... | H04W 72/04 |
| 2018/0227736 A1* | 8/2018 | Lee | ....... | H04W 88/02 |
| 2018/0368080 A1* | 12/2018 | Chae | ....... | H04W 52/36 |
| 2019/0014490 A1* | 1/2019 | Kim | ....... | H04W 24/08 |
| 2019/0014606 A1* | 1/2019 | Li | ....... | H04W 76/14 |

OTHER PUBLICATIONS

Coolpad; "Discussion on Resource Allocation in ProSe Ue-to-Network Relay"; 3GPP TSG RAN WG2 Meeting #90 Fukuoka, Japan, May 25-29, 2015; R2-152346 (Year: 2015).*

Intel Corporation, eNB Controlled Resource Allocation for D2D Communication, 3GPP TSG RAN WG1 Meeting #77, R1-142017, Seoul, Korea, May 19-23, 2014.

3GPP TS 36.213 V12.6.0, 3rd Generation Partnership Project; Technical Specification Group Radio Access Network; Evolved Universal Terrestrial Radio Access (E-UTRA); Physical layer procedures (Release 12), Jun. 2015.

* cited by examiner

PROSE RELAY RESOURCE OPTIMIZATION

This application is a 371 of International Application No. PCT/IB2016/054985, filed Aug. 19, 2016, which claims the benefit of International Application No. PCT/CN2015/087626, filed Aug. 20, 2015, the disclosures of which are fully incorporated herein by reference.

TECHNICAL FIELD

Particular embodiments relate generally to wireless communications networks, and more particularly to optimization of uplink transmission resource allocation where a wireless device transmits data to a wireless network via another wireless device, such as in proximity services (ProSe) relay.

RELATED APPLICATION

This application claims benefit under 35 U.S.C. § 365(c) to International Patent Application Serial No. PCT/CN2015/087626, filed Aug. 20, 2015 and entitled "Optimization on UL Resource Allocation in ProSe Relay," the entire content of which is incorporated herein by reference.

BACKGROUND

Device-to-device (D2D) communication is a component of many existing wireless technologies, including ad hoc and cellular networks. Examples include Bluetooth and several variants of the IEEE 802.11 standards suite, such as WiFi Direct. These systems operate in unlicensed spectrum.

D2D communications as an underlay to cellular networks takes advantage of the proximity of communicating devices and enables devices to operate in a controlled interference environment. Typically, D2D communications share the same spectrum as the cellular system. For example, a D2D device may reserve some of its cellular uplink resources for D2D purposes. Allocating dedicated spectrum for D2D purposes, however, is an unlikely alternative because spectrum is a scarce resource and dynamic sharing between the D2D services and cellular services is more flexible and provides better spectrum efficiency.

A D2D device may send data using various transmission modes. These include unicast (i.e., a specific wireless device is the receiver), multicast (i.e., a group of wireless devices are the receiver—also referred to as groupcast), and broadcast (i.e., all wireless devices are receivers).

When cellular network D2D communication is unavailable, a D2D device may send data to another D2D device without prior arrangement. This reduces overhead and increases communication capacity, which is important in emergency situations. The source D2D device transmits data to one (unicast) or more (multicast/groupcast/broadcast) other D2D devices, without first verifying that the recipient devices are available and ready to receive the data. Such communication may be used for one-to-one or one-to-many communication, but it is particularly effective for multicast and broadcast transmissions and thus well-suited for broadcast and group communication. The communication may occur, for example, via PHY unicast/multicast/groupcast/broadcast transmissions. Even using PHY broadcast transmissions, higher layers may treat the transmissions as unicast, groupcast, or multicast. For example, in the MAC layer, multicast or even unicast addresses may be used. Or, alternatively, if using broadcast on both PHY and MAC, multicast or unicast IP addresses may be used at the IP layer.

One way to efficiently implement D2D communication is to use a scheduling assignment (SA) followed by a data transmission. SAs are control messages used for direct scheduling of D2D communication. SAs are transmitted by the user equipment (UE) that intends to transmit D2D data and they are received by the UEs that are potentially interested in the D2D data. SAs are transmitted on dedicated resources characterized by time and frequency, and are typically a sparse resource. SAs provide information useful to the receiver. For example, a receiving device may use an SA to decode the D2D data transmission associated with the SA (e.g., the resources for data transmission, the modulation/coding parameters, timing information, identities for the transmitter and/or receiver, etc.). Typically, but not necessarily, a D2D device transmits SAs prior to the actual data transmission so that a receiving D2D device is able to selectively receive data based on the content of the SAs. The data transmissions scheduled by a SA may be referred to as a "transmission pattern."

D2D application scenarios include, among others, proximity services (ProSe) where devices detect their proximity and subsequently trigger different services (such as social applications triggered by user proximity, advertisements, local exchange of information, smart communication between vehicles, etc.). Other applications include public safety support, where devices provide at least local connectivity even in case of damage to the radio infrastructure.

A ProSe UE-to-network relay can extend the coverage of the network beyond the coverage of the eNB. A ProSe relay is a UE that performs the role of a relay. The ProSe UE-to-network relay function includes support for relaying of unicast traffic (uplink and downlink) between remote UEs that are not served by evolved UMTS terrestrial radio access network (E-UTRAN) and the network. The ProSe UE-to-network relay provides a generic L3 forwarding function that can relay any type of IP traffic, such as traffic for public safety communication. An example is illustrated in FIG. 1.

FIG. 1 is a block diagram illustrating an example wireless network including a proximity services UE-to-network relay. Remote UE 10b is in one-to-one direct ProSe communication with relay UE 10a over a PC5 layer 2 link. Relay UE 10a is in communication with eNB 20 over a Uu interface, which is in communication with a public safety system via an evolved packet core (EPC). Relay 10a forwards layer 3 traffic from remote UE 10b to eNB 20.

Establishing a link between remote UE 10b and eNB 20 via ProSe UE-to-network relay 10a includes three general steps: (1) setup of relay UE 10a; (2) E-UTRAN assisted relay discovery; and (3) establishment of a secure layer 2 link over PC5. When remote UE 10b receives instruction from eNB 20 to connect to a particular relay, remote UE 10b sends a layer 3 message (from ProSe Signalling Protocol) to associate itself with relay UE 10a. Relay UE 10a responds with the layer 3 message. Connection establishment between remote UE 10b and relay UE 10a uses the ProSe signalling protocol. An example of the PC5 protocol stack is illustrated in FIG. 2.

FIG. 2 is a block diagram illustrating the PC5 protocol stack between a remote UE and a relay UE. A remote UE, such as remote UE 10b illustrated in FIG. 1, communicates with a relay UE, such as relay UE 10A illustrated in FIG. 1, via the ProSe signalling protocol. The ProSe signalling protocol is on top of the PDCP, RLC, MAC, and PHY layers. The priority of a ProSe communication transmission is selected by the application layer based on criteria that are not in the scope of ProSe specifications.

To transmit the data received from remote UE 10b to eNB 20, relay UE 10a requests uplink resources from eNB 20. Remote UE 10b may support a variety of different services. Accordingly, the characteristics of the data relay UE 10b transmits may vary. However, relay UE 10a does not consider the type of service remote UE 10a is providing when relay UE 10a requests resources for relaying data to eNB 20. As a result, relay UE 10a may not request Uu resources for relaying data in the most efficient way.

For example, when a remote UE is running a voice over interne protocol (VoIP) service, the remote UE may transmit data bursts periodically to the eNB via the relay (e.g., a burst every 20 ms). A resource efficient method to relay intermittent data bursts uses semi-persistently scheduled (SPS) resources on the Uu interface. The relay UE, however, does not know that the remote UE is transmitting SPS-like data. As a result, when transmitting the data to the eNB, instead of using SPS resources, the relay UE requests resources for each data burst received from the remote UE. This can be both time and resource consuming. An example is illustrated in FIG. 3.

FIG. 3 is an example flow diagram illustrating allocation of Uu transmission resources. Remote UE 10b transmits periodical data (i.e., Data #1, Data #2, Data #3) to eNB 20 via relay UE 10a. For each burst (i.e., Data #1, Data #2, Data #3), relay UE 10a requests resources separately. For example, at step 30 relay UE 10a receives Data #1 from remote UE 10b. At step 32, relay UE 10a requests resources and receives resource grants from eNB 20. At step 34, relay UE 10a transmits Data #1 to eNB 20. These steps are repeated for each data burst (i.e., steps 36-40 for Data #2 and steps 42-46 for Data #3). Thus, after receiving each data burst, but before transmitting the data burst to the network, the relay UE must request and receive transmission resource grants.

SUMMARY

In the embodiments described herein, a relay wireless device, such as a ProSe relay user equipment (UE), obtains information about a data transmission pattern (e.g., periodic, bulk, etc.) to be received from a source wireless device, such as a ProSe remote UE, to reduce processing and time associated with resource requests on the network interface, such as a long term evolution (LTE) Uu interface. For example, the relay wireless device may request and receive transmission resources to handle multiple data transmission from the source wireless device in advance of receiving data from the source wireless device so that the relay wireless device is not requesting resources for every data burst received from the source wireless device. According to some embodiments, a method in a first wireless device of relaying data from a second wireless device to a wireless communication network comprises: obtaining data transmission pattern information associated with data to be relayed from the second wireless device to the wireless communication network; requesting resources from the wireless communication network according to the data transmission pattern information; receiving an indication of resources from the wireless communication network; receiving the data from the second wireless device; and transmitting the data to the wireless communication network using the indicated resources. The data to be relayed may comprise one or more data bursts and the data transmission pattern information may include at least one of a periodicity of the one or more data bursts, an amount of data associated with each of the one or more data bursts, and a number of the one or more data bursts.

In particular embodiments, obtaining the data transmission pattern information comprises receiving the data transmission pattern information from the second wireless device; determining the data transmission pattern based on a service type or protocol associated with the data to be relayed; or determining the data transmission pattern based on a LTE version supported by the second wireless device.

In particular embodiments, determining the data transmission pattern based on a service type or protocol associated with the data to be relayed comprises performing deep packet inspection. The determined service type or protocol associated with the data to be relayed may comprise voice over internet protocol (VoIP), file transmission protocol (FTP), hypertext transfer protocol (HTTP), or others.

In particular embodiments, the first wireless device comprises a proximity services (ProSe) relay device. The indicated resources may comprise semi-persistently scheduled (SPS) resources.

According to some embodiments, a relay wireless device capable of relaying data from a source wireless device to a wireless communication network comprises a processor, a memory, and a power source. The processor is operable to obtain data transmission pattern information associated with data to be relayed from the source wireless device to the wireless communication network; request resources from the wireless communication network according to the data transmission pattern information; receive an indication of resources from the wireless communication network; receive the data from the source wireless device; and transmit the data to the wireless communication network using the indicated resources. The data to be relayed may comprise one or more data bursts and the data transmission pattern information may include at least one of a periodicity of the one or more data bursts, an amount of data associated with each of the one or more data bursts, and a number of the one or more data bursts.

In particular embodiments, the processor is operable to obtain the data transmission pattern information by receiving the data transmission pattern information from the source wireless device; by determining the data transmission pattern based on a service type or protocol associated with the data to be relayed; or based on a LTE version supported by the source wireless device.

In particular embodiments the processor is operable to perform deep packet inspection to determine the data transmission pattern. The determined service type or protocol associated with the data to be relayed may comprise VoIP, FTP, HTTP, or others.

In particular embodiments, the relay wireless device comprises a ProSe relay device. The indicated resources may comprise SPS resources.

According to some embodiments, a relay wireless device capable of relaying data from a source wireless device to a wireless communication network comprises an obtaining module, a requesting module, a receiving module, and a transmitting module. The obtaining module is operable to obtain data transmission pattern information associated with data to be relayed from the source wireless device to the wireless communication network. The requesting module is operable to request resources from the wireless communication network according to the data transmission pattern information. The receiving module is operable to receive an indication of resources from the wireless communication network and receive the data from the source wireless device. The transmitting module is operable to transmit the data to the wireless communication network using the indicated resources.

According to some embodiments, a relay UE capable of relaying data from a source UE to a wireless communication network comprises an antenna configured to send and receive wireless signals and radio front-end circuitry connected to the antenna and to processing circuitry. The radio front-end circuitry is configured to condition signals communicated between the antenna and the processing circuitry. The processing circuitry is configured to: obtain data transmission pattern information associated with data to be relayed from the source UE to the wireless communication network; request resources from the wireless communication network according to the data transmission pattern information; receive an indication of resources from the wireless communication network; receive the data from the source UE; and transmit the data to the wireless communication network using the indicated resources. The relay UE further comprises an input interface connected to the processing circuitry and configured to allow input of information into the relay UE to be processed by the processing circuitry. The relay UE comprises an output interface connected to the processing circuitry and configured to output information from the relay UE that has been processed by the processing circuitry. The relay UE also comprises a battery connected to the processing circuitry and configured to supply power to the relay UE.

Also disclosed is a computer program product. The computer program product comprises instructions stored on non-transient computer-readable media which, when executed by a processor, performs the act of obtaining data transmission pattern information associated with data to be relayed from the second wireless device to the wireless communication network; requesting resources from the wireless communication network according to the data transmission pattern information; receiving an indication of resources from the wireless communication network; receiving the data from the second wireless device; and transmitting the data to the wireless communication network using the indicated resources. The data to be relayed may comprise one or more data bursts and the data transmission pattern information may include at least one of a periodicity of the one or more data bursts, an amount of data associated with each of the one or more data bursts, and a number of the one or more data bursts.

Particular embodiments may exhibit some of the following technical advantages. Particular embodiments may reduce an amount of processing and time associated with resource requests on the network interface. For example, the requesting and granting of resources may be optimized based on a particular data transmission pattern. The relay wireless device may not need to request resource grants each time a data burst is received from a source wireless device. Thus, the time between a relay wireless device receiving data from the source wireless device and the relay wireless device transmitting the received data to the network may be reduced, which may increase data throughput. Other technical advantages will be readily apparent to one skilled in the art from the following figures, description and claims.

BRIEF DESCRIPTION OF THE DRAWINGS

For a more complete understanding of the embodiments and their features and advantages, reference is now made to the following description, taken in conjunction with the accompanying drawings, in which.

DETAILED DESCRIPTION

Figure 1:
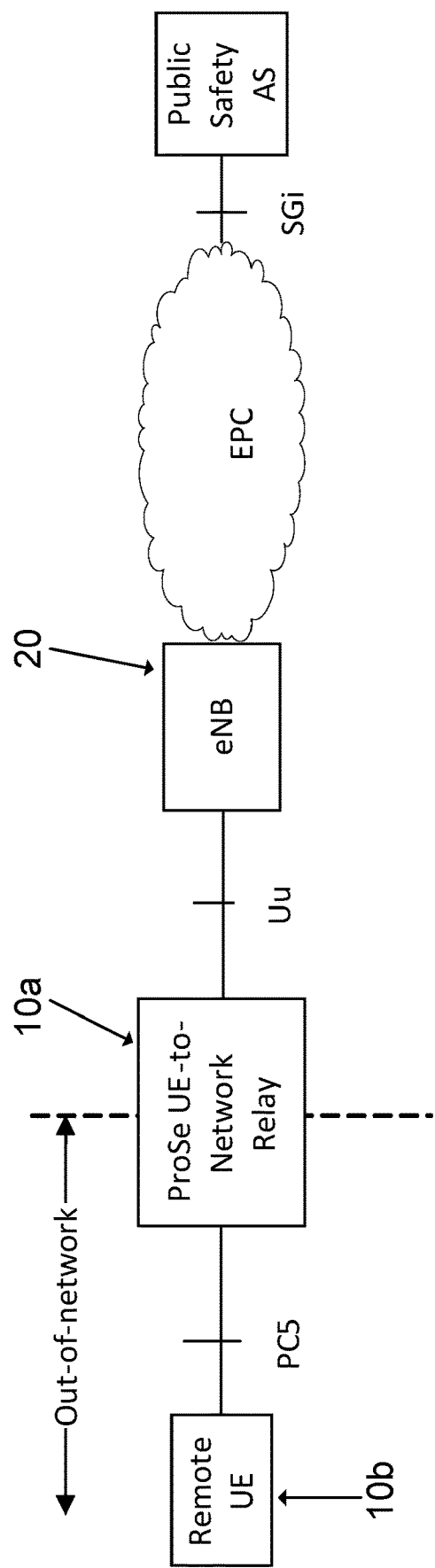
FIG. 1 is a block diagram illustrating an example wireless network including a proximity services UE-to-network relay.
Figure 2:
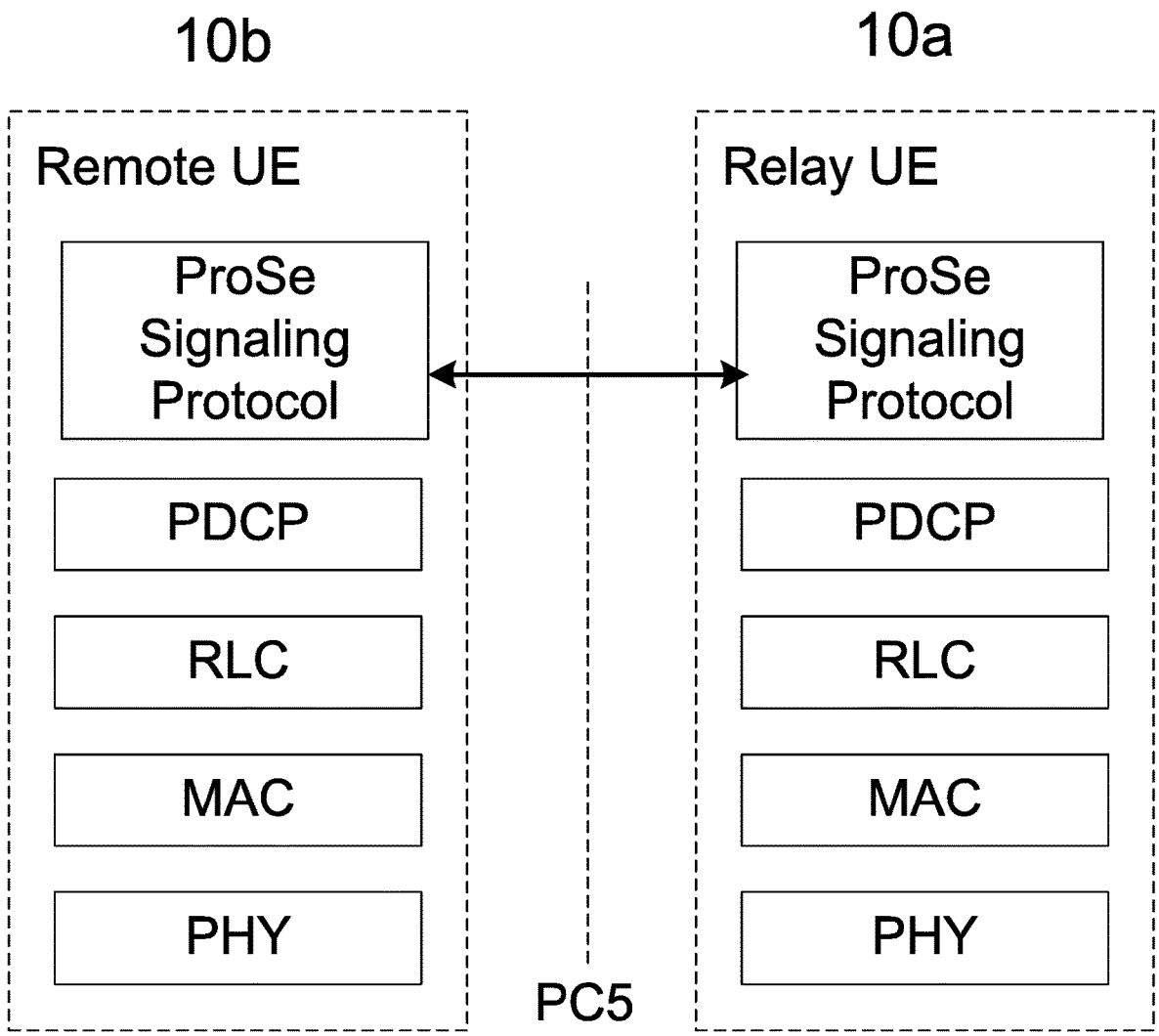
FIG. 2 is a block diagram illustrating the PC5 protocol stack between a remote UE and a relay UE.
Figure 3:
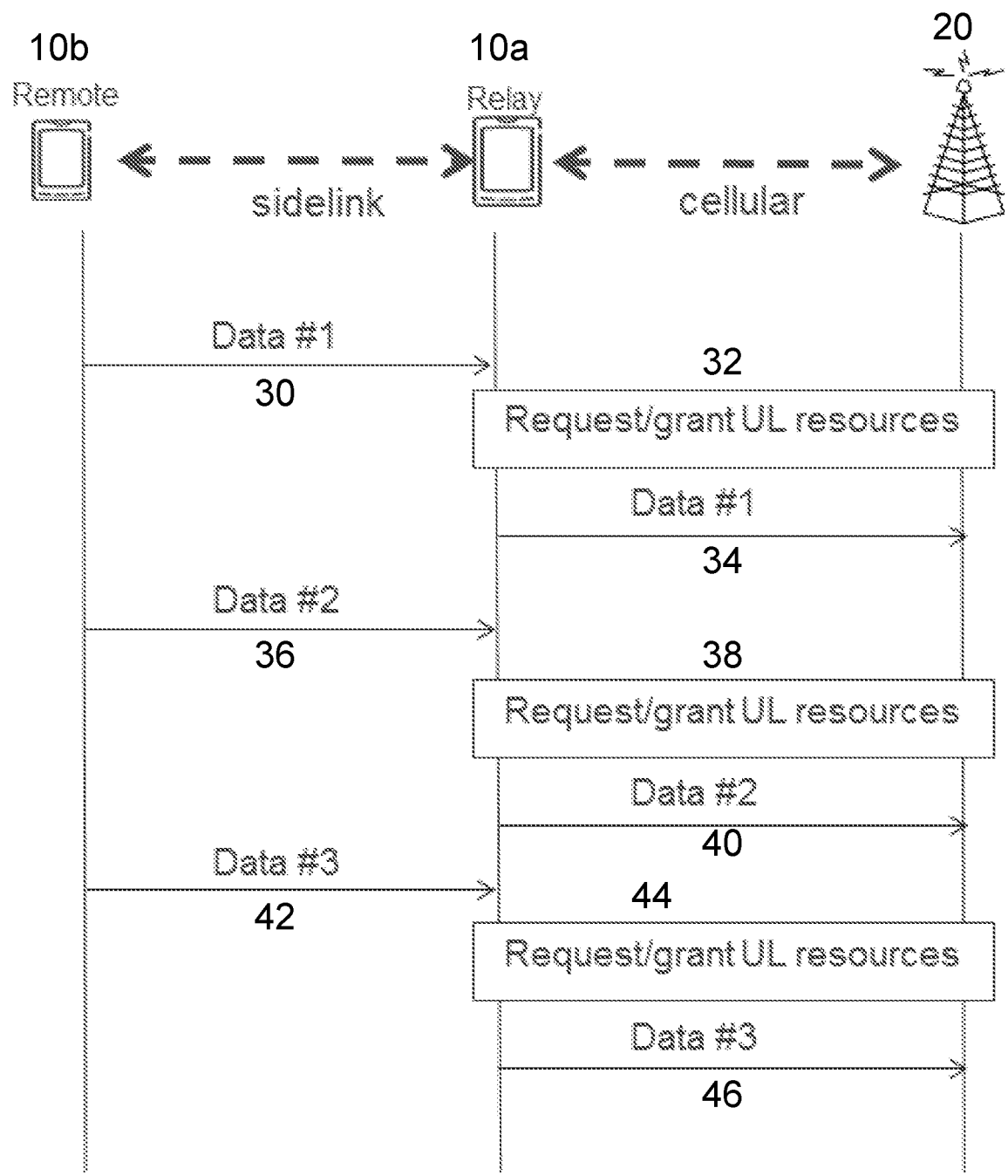
FIG. 3 is an example flow diagram illustrating allocation of Uu transmission resources.

A relay wireless device requests uplink resources from a network node to transmit data received from a source wireless device to a wireless network. The source wireless device may support a variety of services, and the data transmission patterns associated with the different services may vary. A conventional relay wireless device does not consider the type of service the source wireless device is providing when the relay wireless device requests resources for relaying data to the wireless network. Thus, the relay wireless device may not request transmission resources for relaying data in the most efficient way.

For example, a source wireless device running a voice over internet protocol (VoIP) service may transmit data bursts periodically (e.g., a fixed size burst every 20 ms). To efficiently relay intermittent data bursts, a wireless device may use semi-persistently scheduled (SPS) resources. With SPS, the wireless device automatically receives a resource allocation according to a particular periodicity. A conventional relay wireless device, however, does not know that the source wireless device is transmitting SPS-like data. Thus, instead of using SPS resources, the relay wireless device requests resources for each data burst received from the source wireless device, which is not as efficient as SPS.

SPS may not always be the most efficient resource allocation method. For example, when the source wireless device is uploading a large file with FTP/HTTP protocol, instead of using SPS resources, an efficient method of requesting resources may be for the relay wireless device to request a relatively large amount of resources in a single request. The amount of resources may be larger than the amount of resources required for any single data transmission from the source wireless device. Thus, the relay wireless device may relay multiple transmissions from the source wireless device to the network without requesting additional transmission resources.

Particular embodiments obviate the problems described above and include obtaining information about a data transmission pattern (e.g., periodic, bulk, etc.) to be received from a source wireless device to reduce processing and time associated with resource requests on the network interface. The relay wireless device may use the information about the data transmission pattern to more efficiently request transmission resources.

The requesting and granting of resources may be optimized based on a particular data transmission pattern. The relay wireless device may not need to request resource grants each time a data burst is received from the source wireless device. Thus, the time between a relay wireless device receiving data from the source wireless device and the relay wireless device transmitting the received data to the network may be reduced, which may increase data throughput.

The following description sets forth numerous specific details. It is understood, however, that embodiments may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments, whether or not explicitly described.

Particular embodiments are described with reference to FIGS. 4-10 of the drawings, like numerals being used for like and corresponding parts of the various drawings. LTE is used throughout this disclosure as an example cellular system, but the ideas presented herein may apply to other wireless communication systems as well.

Figure 4:
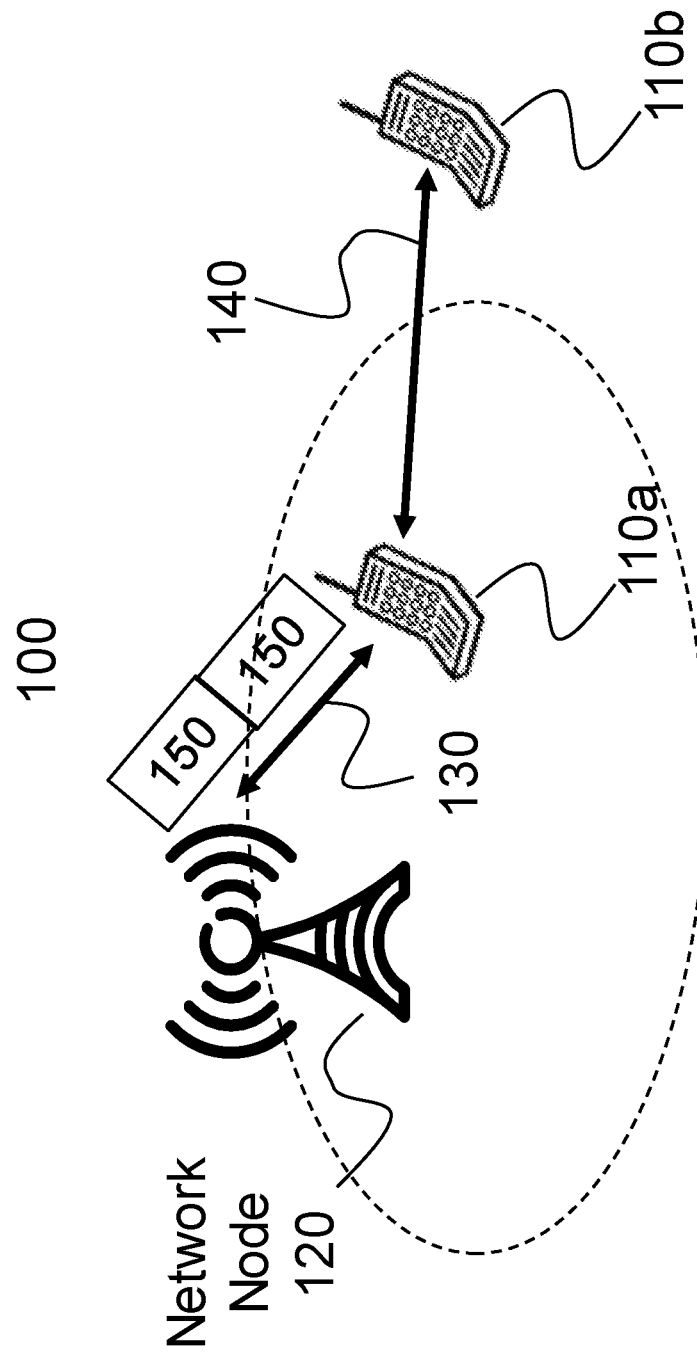
FIG. 4 is a block diagram illustrating an example wireless network, according to some embodiments.

FIG. 4 is a block diagram illustrating an example wireless network, according to a particular embodiment. Wireless network 100 includes one or more wireless devices 110 (such as mobile phones, smart phones, laptop computers, tablet computers, MTC devices, or any other devices that can provide wireless communication) and a plurality of network nodes 120 (such as base stations or eNodeBs). Wireless device 110 may also be referred to as a UE. Radio network node 120 serves coverage area 115 (also referred to as cell 115).

In general, wireless devices 110 that are within coverage of radio network node 120 (e.g., within cell 115 served by network node 120) communicate with radio network node 120 by transmitting and receiving wireless signals 130. For example, wireless devices 110 and radio network node 120 may communicate wireless signals 130 containing voice traffic, data traffic, and/or control signals. A network node 120 communicating voice traffic, data traffic, and/or control signals to wireless device 110 may be referred to as a serving network node 120 for the wireless device 110. Communication between wireless device 110 and network node 120 may be referred to as cellular communication. Wireless signals 130 may include both downlink transmissions (from radio network node 120 to wireless devices 110) and uplink transmissions (from wireless devices 110 to radio network node 120).

Each network node 120 may have a single transmitter or multiple transmitters for transmitting signals 130 to wireless devices 110. In some embodiments, network node 120 may comprise a multi-input multi-output (MIMO) system. Similarly, each wireless device 110 may have a single receiver or multiple receivers for receiving signals 130 from network nodes 120 or other wireless devices 110.

Wireless devices 110 may communicate with each other (i.e., D2D operation) by transmitting and receiving wireless signals 140. For example, wireless device 110a may communicate with wireless device 110b using wireless signal 140. Wireless signal 140 may also be referred to as sidelink 140. Communication between two wireless devices 110 may be referred to as D2D communication or sidelink communication. A particular D2D application includes ProSe communications.

In particular embodiments, wireless signal 140 may use a different carrier frequency than the carrier frequency of wireless signal 130. For example, wireless device 110a may communicate with network node 120a using a first frequency band and may communicate with wireless device 110b using the same frequency band or a second frequency band. Wireless devices 110a and 110b may be served by the same network node 120 or by different network nodes 120. In particular embodiments, one or both of network nodes 110a and 110b may be out-of-coverage of any network node 120.

In particular embodiments, wireless devices 110 may communicate with each other using particular transmission resources 150. Transmission resources 150 comprise particular time and frequency resources. Transmission resources 150 may be shared among both D2D communications (i.e., between wireless devices 110) and cellular communications (i.e., between wireless device 110 and network node 120). For example, particular embodiments may reserve some of the cellular uplink resources for D2D communication.

In particular embodiments, D2D transmission resources 150 may include pooled resources. For example, particular embodiments may define a number of pools available for sending discovery, control, or data transmissions. In LTE, wireless device 110 may transmit discovery messages on a PSDCH, control messages on a PSCCH, and data on a PSSCH. To transmit data, wireless device 110 may use one or more transmission resources 150 (e.g., time and/or frequency resources) from one of the D2D resource pools. When wireless device 110 is in communication with network node 120, wireless device 110 may receive one more pool configurations from network node 120. When wireless device 110 is out-of-coverage, wireless device 110 may rely on preconfigured D2D pools.

In particular embodiments, wireless device 110a may comprise a ProSe UE-to-network relay. Wireless device 110a may be in-coverage of network node 120 and wireless device 110b may out-of-coverage of network node 120. Wireless device 110a may connect wireless device 110b to network node 120 by relaying transmissions from wireless device 110b to network node 120. In particular embodiments, wireless device 110b may be in one-to-one direct ProSe communication with wireless device 110a over a PC5 layer 2 link. Wireless device 110a may be in communication with network node 120 over a Uu interface. Wireless device 110a may forward layer 3 traffic from wireless device 110b to network node 120.

To transmit data received from wireless device 110b to network node 120, wireless device 110a may request transmission resources 150 (e.g., uplink resources) from network node 120. Wireless device 110b may support a variety of different services, each comprising a particular data transmission pattern.

In particular embodiments, wireless device 110a may obtain data transmission pattern information associated with data to be relayed from wireless device 110b to network node 120. Wireless device 110a may request transmission resources 150 from network node 120 according to the data transmission pattern information (e.g., SPS resources for period patterns, bulk resources for uploads, etc.). Wireless device 110a may receive an indication of transmission resources 150 from the wireless communication network (e.g., receive an uplink grant). Wireless device 110a may receive data from wireless device 110b and transmit the data to network node 120 using the indicated transmission resources 150. Particular algorithms for requesting transmission resources 150 are described in more detail with respect to FIGS. 5-7.

In wireless network 100, each radio network node 120 may use any suitable radio access technology, such as long term evolution (LTE), LTE-Advanced, UMTS, HSPA, GSM, cdma2000, WiMax, WiFi, and/or other suitable radio access technology. Wireless network 100 may include any suitable combination of one or more radio access technologies. For purposes of example, various embodiments may be described within the context of certain radio access technologies. However, the scope of the disclosure is not limited to the examples and other embodiments could use different radio access technologies.

As described above, embodiments of a wireless network may include one or more wireless devices and one or more different types of radio network nodes capable of communicating with the wireless devices. The network may also include any additional elements suitable to support communication between wireless devices or between a wireless device and another communication device (such as a landline telephone). A wireless device may include any suitable combination of hardware and/or software. For example, in particular embodiments, a wireless device, such as wireless device 110, may include the components described with respect to FIG. 9A below. Similarly, a network node may include any suitable combination of hardware and/or software. For example, in particular embodiments, a network node, such as network node 120, may include the components described with respect to FIG. 10 below.

According to some embodiments, a relay wireless device may use the data transmission pattern characteristics of various services to reduce the resource and time consumption for resource requests from the network (e.g., resource requests on the Uu interface). For example, when a source wireless device transmits data bursts periodically to the network node via the relay wireless device, such as in a VoIP service, the source wireless device may transmit the characteristic information of the data burst to the relay wireless device. For example, the source wireless device may transmit the periodicity, amount of data of each burst, and an expected number of bursts. In the VoIP example, the relay wireless device may use the received information to request SPS resources from the network node. When the relay wireless device receives a data burst from the source wireless device, the relay wireless device may transmit the data burst to the network node using SPS resources.

A particular advantage of some embodiments is that the relay wireless device may request transmission resources in a more efficient way. This may save time and resource consumption associated with transmission resource allocation. It optimizes resource allocation on the network interface according to the data transmission pattern, which may reduce delay and resource consumption. An example is illustrated in FIG. 5.

Figure 5:
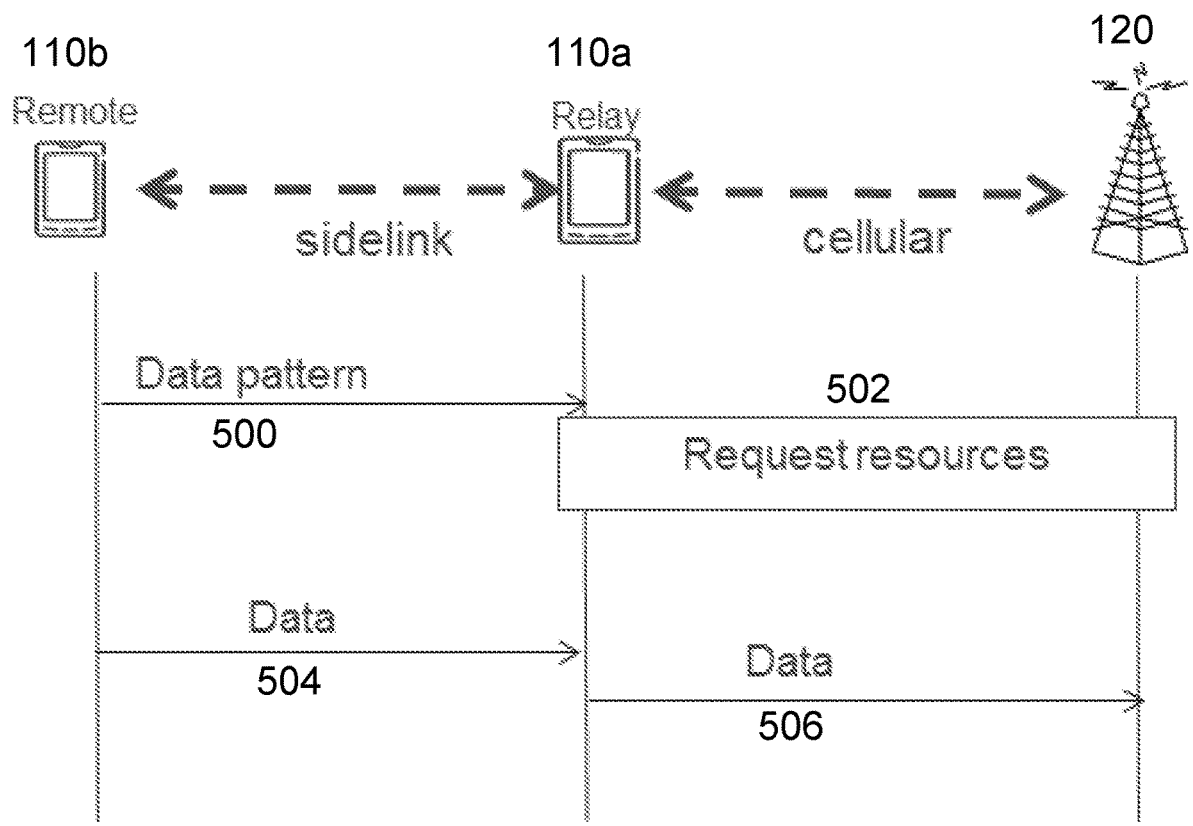
FIG. 5 is an example flow diagram illustrating allocation of transmission resources based on transmission data pattern, according to some embodiments.

FIG. 5 is an example flow diagram illustrating allocation of transmission resources based on transmission data pattern, according to some embodiments. In particular embodiments, the source wireless device transmits information about the data transmission pattern prior to the data transmission. For example, at step 500 source wireless device 110b transmits information about the data transmission pattern to relay wireless device 110a. In particular embodiments, data transmission pattern information may be transmitted from source wireless device 110b to relay wireless device 110a via MAC, RRC, another suitable physical layer signalling protocol, or any other signalling in general. In particular embodiments, relay wireless device 110a may obtain data transmission pattern information based on the corresponding service type/protocols (e.g., VoIP, SMS, FTP, HTTP, etc.). For example, wireless device 110a may determine that VoIP data transmissions are periodic transmission with a particular burst size.

At step 502, wireless device 110a requests transmission resources 150 (e.g., uplink cellular resources) from network node 120 according to the data transmission pattern. For example, for a transmission pattern consistent with VoIP transmissions, wireless device 110a may immediately request SPS resources on the network interface (e.g., Uu interface). For a transmission pattern consistent with FTP transmissions, wireless device 110a may request a large amount of resources but some delay in making the request or receiving the resource grant is acceptable.

At step 504, wireless device 110b transmits data to wireless device 110a. Wireless device 110a does not need to request transmission resources (unlike a conventional relay) because the transmission resources were already requested and granted at previous step 502. Accordingly, at step 506 wireless device 110a transmits the data to network node 120 using at least part of the previously granted transmission resources. Particular examples of requesting specific VoIP and FTP resources are illustrated in FIGS. 6 and 7, respectively.

Figure 6:
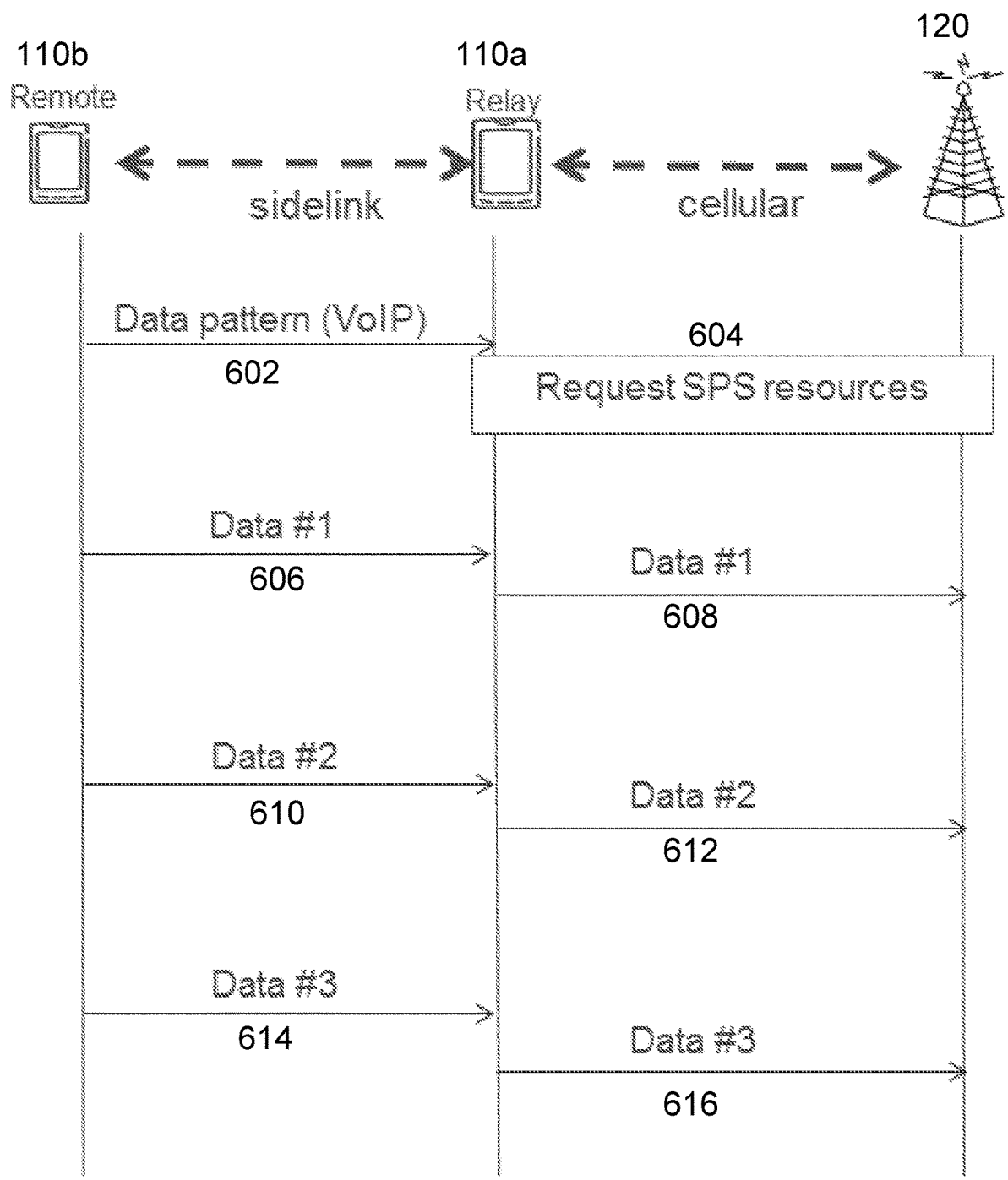
FIG. 6 is an example flow diagram illustrating allocation of transmission resources based on a VoIP protocol transmission pattern, according to some embodiments.
Figure 7:
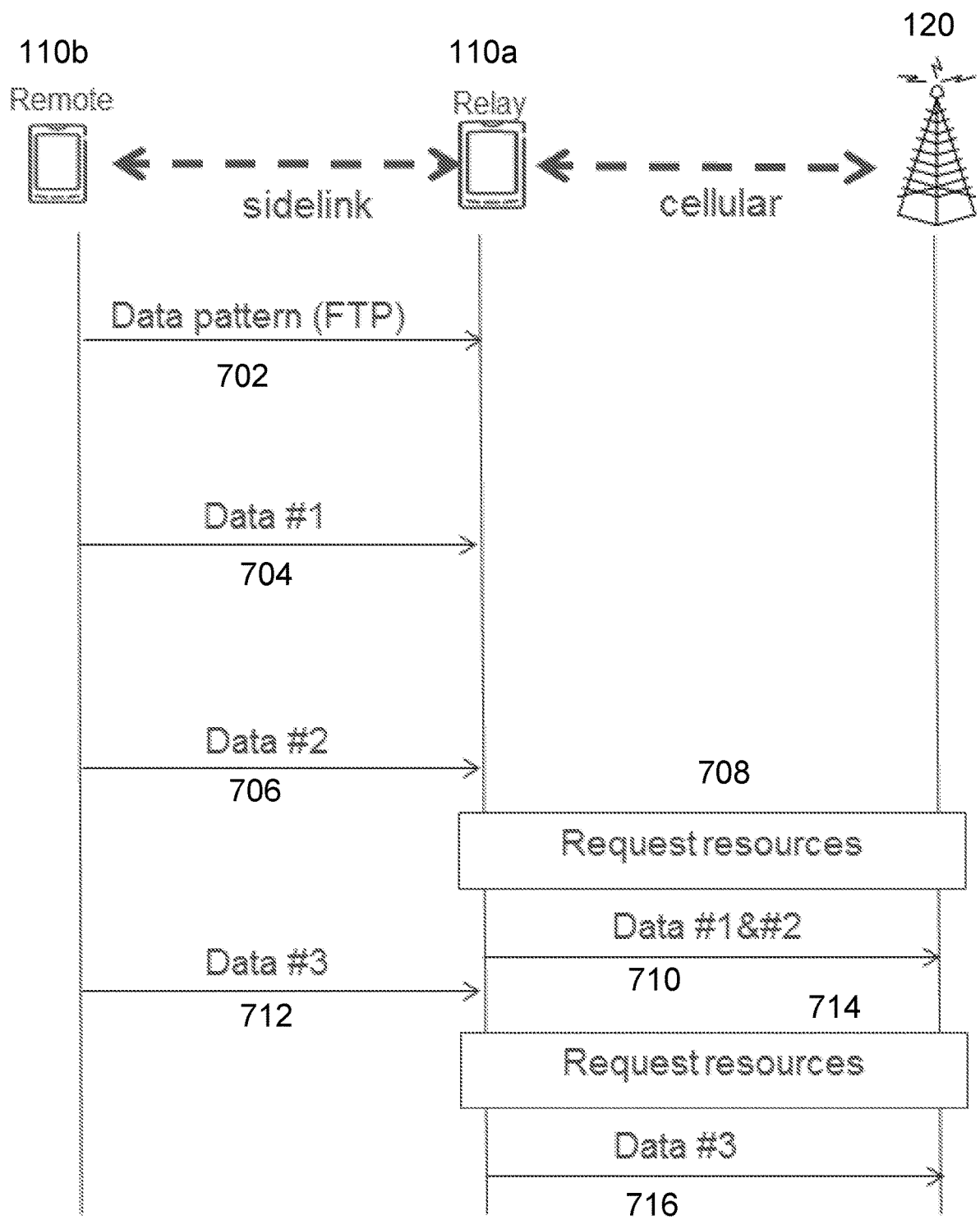
FIG. 7 is an example flow diagram illustrating allocation of transmission resources based on an FTP protocol transmission pattern, according to some embodiments.

FIG. 6 is an example flow diagram illustrating allocation of transmission resources based on a VoIP protocol transmission pattern, according to some embodiments. In particular embodiments, the source wireless device transmits information about the data transmission pattern prior to the data transmission. For example, at step 602 source wireless device 110b prepares to start transmitting VoIP data to relay wireless device 110a by signalling a data transmission pattern to relay wireless device 110a.

In particular embodiments, source wireless device 110b may explicitly signal the data transmission pattern (e.g., periodicity of 20 ms, a size of each data burst, and/or a duration, such as 5 seconds). In particular embodiments, source wireless device 110b may signal a protocol type (i.e., VoIP) and relay wireless device 110a may determine the periodicity, size, and duration based on the protocol type.

At step 604, relay wireless device 110a requests SPS resources on the Uu interface with network node 120 according to the data transmission pattern information. For example, relay wireless device 110a may request SPS resources with a periodicity of 5 ms over the next 5 seconds. Network node 120 grants the SPS resources.

At step 606, source wireless device 110b transmits the first VoIP data burst to relay wireless device 110a. The arrival of the first VoIP data burst at relay wireless device 110a coincides with the availability of an instance of the previously requested SPS resources.

At step 608, relay wireless device 110a transmits the first VoIP data burst to network node 120 using the SPS resources. Relay wireless device 110a does not waste time requesting and waiting for resources because the SPS resources are already available from step 604. Approximately 5 ms later relay wireless device 110a repeats the same process for the second VoIP data burst at steps 610 and 612.

As another example, instead of voice communications, source wireless device 110b may upload a file to the network. An example is illustrated in FIG. 7.

FIG. 7 is an example flow diagram illustrating allocation of transmission resources based on an FTP protocol transmission pattern, according to some embodiments. In particular embodiments, the source wireless device transmits information about the data transmission pattern prior to the data transmission. For example, at step 702 source wireless device 110b prepares to start transmitting FTP data to relay wireless device 110a by signalling a data transmission pattern to relay wireless device 110a.

In particular embodiments, source wireless device 110b may explicitly signal the data transmission pattern (e.g., a protocol type of FTP, and/or a total data size). For example, if the file to be uploaded is 1 MB, then source wireless device 110b may signal a data size of 1 MB to relay wireless device 110a. In other embodiments, source wireless device 110b may signal any suitable subset of the file size (e.g., signal two subsequent data transmissions patterns each with a data size of 0.5 MB).

The FTP protocol is less sensitive to delay than, for example, the VoIP protocol described in the previous example. Thus, relay wireless device 110a may, but need not, immediately request resources from network node 120. In the illustrated example, source wireless device 110b transmits the first and second FTP data bursts to relay wireless device 110a at steps 702 and 704, respectively. Relay wireless device 110a buffers and waits to forward the first two data bursts until after relay wireless device 110a requests and receives transmission resources 150 at step 708.

At step 708, relay wireless device 110a requests transmission resources 150 on the Uu interface with network node 120 according to the data transmission pattern information. For example, relay wireless device 110a may request an amount of transmission resources 150 sufficient to transmit the data size signalled at previous step 702. In some embodiments, relay wireless device 110a may request a subset of the signalled data size. Network node 120 grants some or all of the requested transmission resources 150.

At step 710, relay wireless device 110a transmits the first and second FTP data bursts to network node 120 using a portion of the requested transmission resources 150. Relay wireless device 110a does not separately request transmission resources 150 for FTP data bursts 1 and 2. Instead, relay wireless device 110a is able to efficiently forward FTP data bursts 1 and 2 to network node 120 using a portion of transmission resources 150 previously granted at step 708.

At step 712, source wireless device 110b transmits the third FTP data burst to relay wireless device 110a. If relay wireless device 110a still has transmission resources 150 available, relay wireless device 110a may use them to transmit FTP data burst 3 to network node 120. In the illustrated example, however, relay wireless device 110a used all of previously allocated transmission resources 150 to transmit FTP data bursts 1 and 2.

At step 714, relay wireless device 110a requests transmission resources 150 on the Uu interface with network node 120 according to the data transmission pattern information and/or transmission resources 150 previously requested. For example, if relay wireless device 110a initially requested and received transmission resources 150 sufficient to transmit 0.5 MB of data at step 708, then relay wireless device 110a may request transmission resources 150 sufficient to transmit another 0.5 MB of data at step 714. Network node 120 grants some or all of the requested transmission resources 150.

At step 716, relay wireless device 110a transmits the third FTP data burst to network node 120 using a portion of the requested transmission resources 150. FIG. 7 illustrates one example timeline of receiving data, requesting transmission resources, and forwarding data. Other embodiments may perform the steps in any suitable order.

Although VoIP and FTP are described as examples, particular embodiments may include other protocol types, such as HTTP or any other suitable protocol. The examples described with respect to FIGS. 5-7 may be generally represented by the flowchart in FIG. 8.

Figure 8:
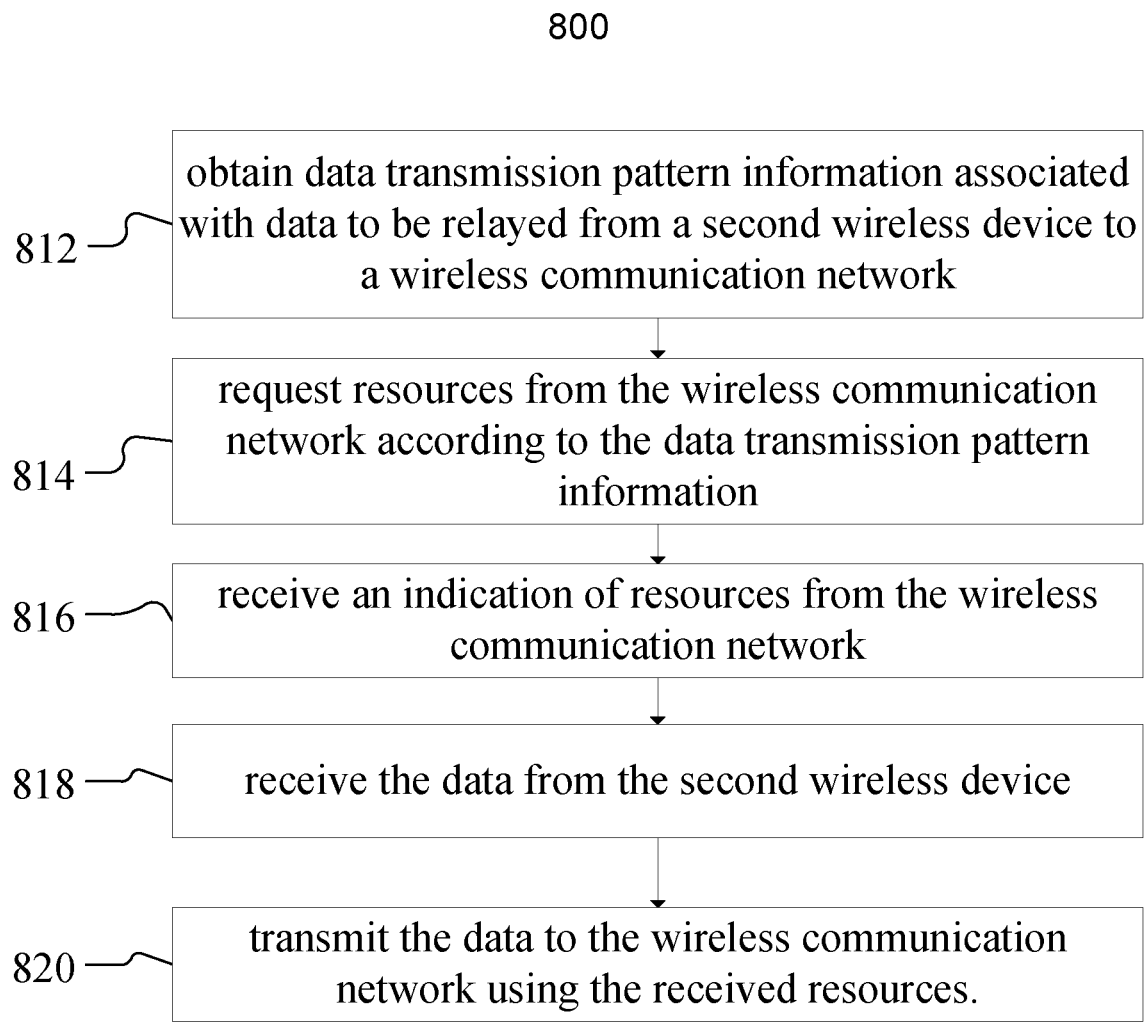
FIG. 8 is a flow diagram illustrating an example method in a first wireless device of relaying data from a second wireless device to a wireless communication network, according to some embodiments.

FIG. 8 is a flow diagram illustrating an example method in a first wireless device of relaying data from a second wireless device to a wireless communication network, according to some embodiments. In particular embodiments, one or more steps of FIG. 8 may be performed by a wireless device 110 of wireless network 100 described with respect to FIG. 4.

The method begins at step 812, where a first wireless device obtains data transmission pattern information associated with data to be relayed from a second wireless device to a wireless communication network. For example, wireless device 110a may obtain data transmission pattern information (e.g., periodic pattern, such as VoIP, or bulk transfer pattern, such as FTP) from wireless device 110b associated with data to be relayed to network node 120.

In particular embodiments, obtaining the data transmission pattern information comprises receiving explicit or implicit signaling according to any of the embodiments described with respect to FIGS. 5-7. In some embodiments, wireless device 110a may not receive signaling from wireless device 110b. Obtaining the data transmission pattern information may comprise performing deep packet inspection.

For example, wireless device 110a may perform deep packet inspection (i.e., inspecting a higher or lower layer protocol, such as a layer 3 protocol) on data received from wireless device 110b to analyze the data pattern. For example, wireless device 110 may perform deep packet inspection to determine the received data is VoIP, FTP, HTTP, etc., and use a data transmission pattern appropriate for the particular protocol type.

In some embodiments, obtaining the data transmission pattern may comprise determining the data transmission pattern based on a long term evolution (LTE) version supported by the second wireless device. For example, wireless device 110a may determine that wireless device 110b is a D2D device operating according to LTE Release 12. If LTE Release 12 only supports VoIP as a ProSe application, then wireless device 110a may assume that the data transmission pattern information for data received from wireless device 110b is a transmission pattern associated with VoIP (e.g., a periodic transmission pattern).

At step 814, the first wireless device requests resources from the wireless communication network according to the data transmission pattern information. For example, wireless device 110a may request transmission resources 150 from network node 120 according the data transmission pattern (e.g., periodic, bulk transfer, etc.) received at step 812.

In particular embodiments, wireless device 110a may request SPS resources for a periodic data transmission pattern, such as a VoIP pattern, or wireless device 110a may request a block of transmission resources for a bulk transfer data transmission pattern, such as a FTP pattern. In particular embodiments, wireless device 110a may request transmission resources 150 according to any of the embodiments described with respect to FIGS. 5-7.

At step 816, the first wireless device receives an indication of resources from the wireless communication network. For example, wireless device 110a may receive a resource grant (i.e., and indication of which transmission resources 150 wireless device 110a may use for uplink transmission) from network node 120.

At step 818, the first wireless device receives the data from the second wireless device. For example, wireless device 110a receives some or all of the data (e.g., VoIP, FTP, HTTP, etc.) to be relayed from wireless device 110b to network node 120.

At step 820, the first wireless device transmits the data to the wireless communication network using the received resources. For example, wireless device 110a transmits the data received from wireless device 110b to network node 120 using the resources granted at step 816.

In particular embodiments, the first wireless device may continue to receive data transmissions from the second wireless device and forward the received data transmissions to the wireless communications network until the transmission resources granted at step 816 are no longer available. At that time, the first wireless device may request additional transmission resources as described with respect to step 814.

Modifications, additions, or omissions may be made to method 800. Additionally, one or more steps in method 800 of FIG. 8 may be performed in parallel or in any suitable order. The steps of method 800 may be repeated over time as necessary.

Figure 9A:
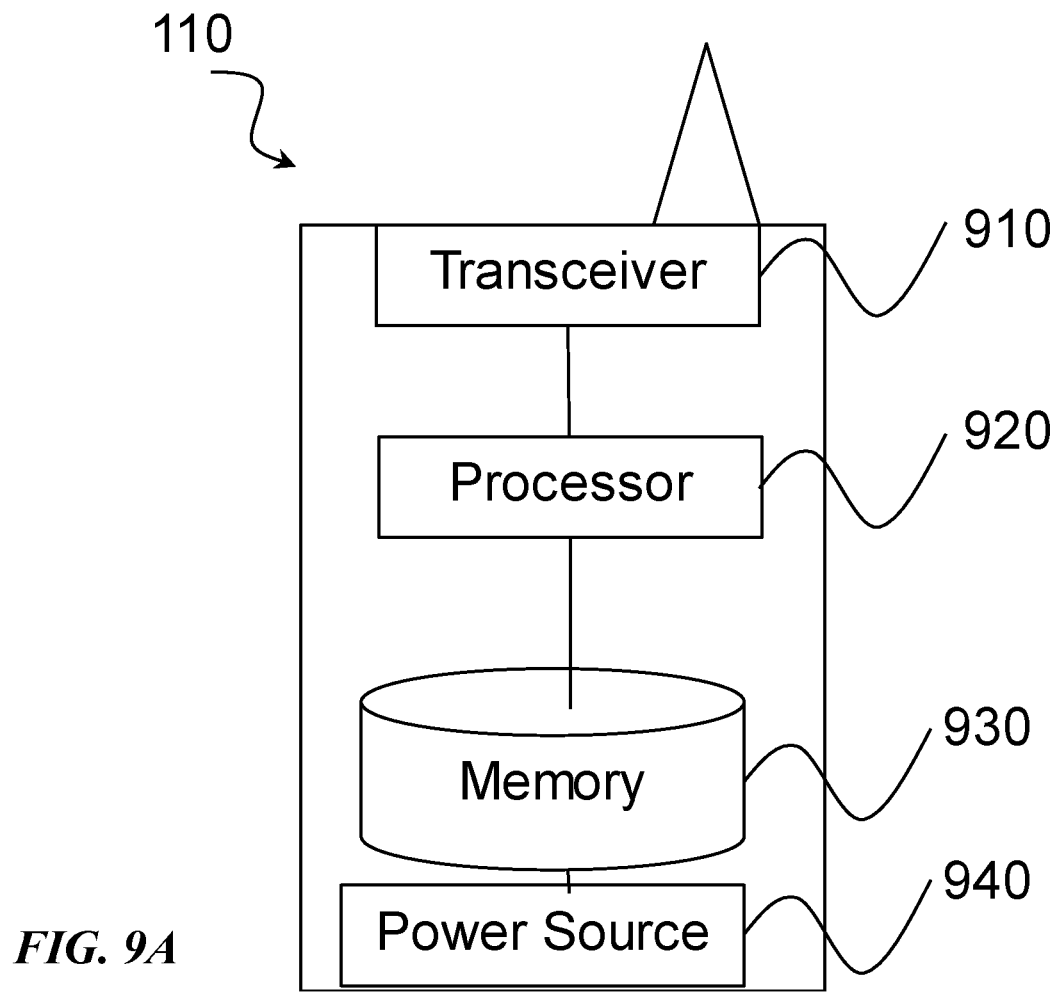
FIG. 9A is a block diagram illustrating an example embodiment of a wireless device.

FIG. 9A is a block diagram illustrating an example embodiment of a wireless device. The wireless device is an example of the wireless devices 110 illustrated in FIG. 4. The wireless device is capable of relaying data from another wireless device to a wireless communication network. The wireless device obtains data transmission pattern information associated with data to be relayed from the second wireless device to the wireless communication network. The wireless device uses the data transmission pattern information to request resources from the wireless communication network and receives an indication of resources from the wireless communication network. The wireless device receives data from the second wireless device; and transmits the data to the wireless communication network using the indicated resources. In particular embodiments, the wireless devices obtains the data transmission pattern information by receiving the data transmission pattern information from the second wireless device; by determining the data transmission pattern based on a service type or protocol associated with the data to be relayed; or by determining the data transmission pattern based on a LTE version supported by the second wireless device.

Particular examples of a wireless device include a mobile phone, a smart phone, a PDA (Personal Digital Assistant), a portable computer (e.g., laptop, tablet), a sensor, a modem, a machine type (MTC) device/machine to machine (M2M) device, laptop embedded equipment (LEE), laptop mounted equipment (LME), USB dongles, a device-to-device capable device, a vehicle-to-vehicle device, or any other device that can provide wireless communication. The wireless device includes transceiver 910, processor 920, memory 930, and power supply 940. In some embodiments, transceiver 910 facilitates transmitting wireless signals to and receiving wireless signals from wireless network node 120 (e.g., via an antenna), processor 920 executes instructions to provide some or all of the functionality described herein as provided by the wireless device, and memory 930 stores the instructions executed by processor 920. Power supply 940 supplies electrical power to one or more of the components of wireless device 110, such as transceiver 910, processor 920, and/or memory 930.

Processor 920 includes any suitable combination of hardware and software implemented in one or more integrated circuits or modules to execute instructions and manipulate data to perform some or all of the described functions of the wireless device. In some embodiments, processor 920 may include, for example, one or more computers, one more programmable logic devices, one or more central processing units (CPUs), one or more microprocessors, one or more applications, and/or other logic, and/or any suitable combination of the preceding. Processor 920 may include analog and/or digital circuitry configured to perform some or all of the described functions of wireless device 110. For example, processor 920 may include resistors, capacitors, inductors, transistors, diodes, and/or any other suitable circuit components.

Memory 930 is generally operable to store computer executable code and data. Examples of memory 730 include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or or any other volatile or non-volatile, non-transitory computer-readable and/or computer-executable memory devices that store information.

Power supply 940 is generally operable to supply electrical power to the components of wireless device 110. Power supply 940 may include any suitable type of battery, such as lithium-ion, lithium-air, lithium polymer, nickel cadmium, nickel metal hydride, or any other suitable type of battery for supplying power to a wireless device.

In particular embodiments, processor 920 in communication with transceiver 910 obtains data transmission pattern information associated with data to be relayed from the source wireless device to the wireless communication network; requests resources from the wireless communication network according to the data transmission pattern information; receives an indication of resources from the wireless communication network; receives the data from the source wireless device; and transmits the data to the wireless communication network using the indicated resources.

Other embodiments of the wireless device may include additional components (beyond those shown in FIG. 9A) responsible for providing certain aspects of the wireless device's functionality, including any of the functionality described above and/or any additional functionality (including any functionality necessary to support the solution described above).

Figure 9B:
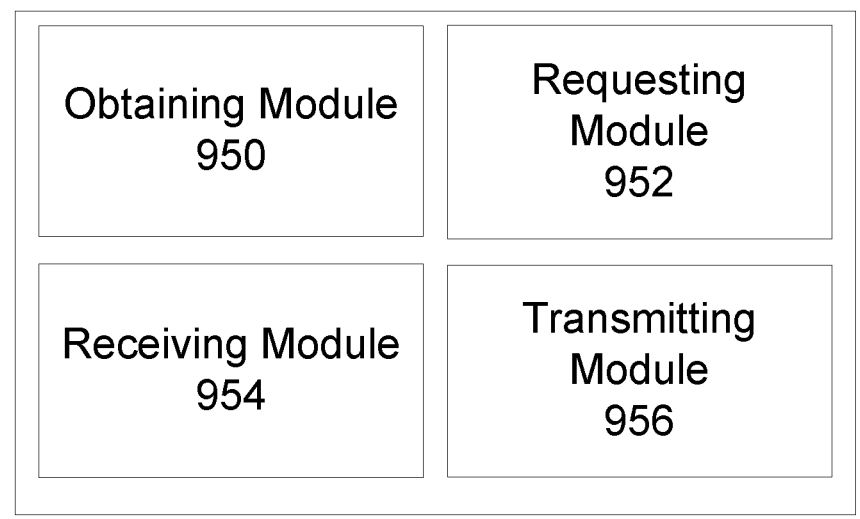
FIG. 9B is a block diagram illustrating example components of a wireless device.

FIG. 9B is a block diagram illustrating example components of a wireless device 110. The components may include obtaining module 950, requesting module 952, receiving module 954, and transmitting module 956.

Obtaining module 950 may perform the obtaining functions of wireless device 110. For example, obtaining module 950 may obtain data transmission pattern information associated with data to be relayed from a source wireless device to a wireless communication network. In certain embodiments, obtaining module 950 may include or be included in processor 920. In particular embodiments, obtaining module 950 may communicate with requesting module 952, receiving module 954, and transmitting module 956.

Requesting module 952 may perform the requesting functions of wireless device 110. For example, requesting module 952 may request resources from the wireless communication network according to the data transmission pattern information. In certain embodiments, requesting module 952 may include or be included in processor 920. In particular embodiments, requesting module 952 may communicate with obtaining module 950, receiving module 954, and transmitting module 956.

Receiving module 954 may perform the receiving functions of wireless device 110. For example, receiving module 954 may receive an indication of resources from the wireless communication network, and receive data from a source wireless device. In certain embodiments, receiving module 954 may include or be included in processor 920. Receiving module 954 may include circuitry configured to receive radio signals. In particular embodiments, receiving module 954 may communicate with obtaining module 950, requesting module 952, and transmitting module 956.

Transmitting module 956 may perform the transmitting functions of wireless device 110. For example, transmitting module 956 may transmit the data received from the source wireless device to the wireless communication network using the requested resources. In certain embodiments, transmitting module 956 may include or be included in processor 920. Transmitting module 956 may include circuitry configured to transmit radio signals. In particular embodiments, transmitting module 956 may communicate with obtaining module 950, requesting module 952, and receiving module 954.

Figure 10:
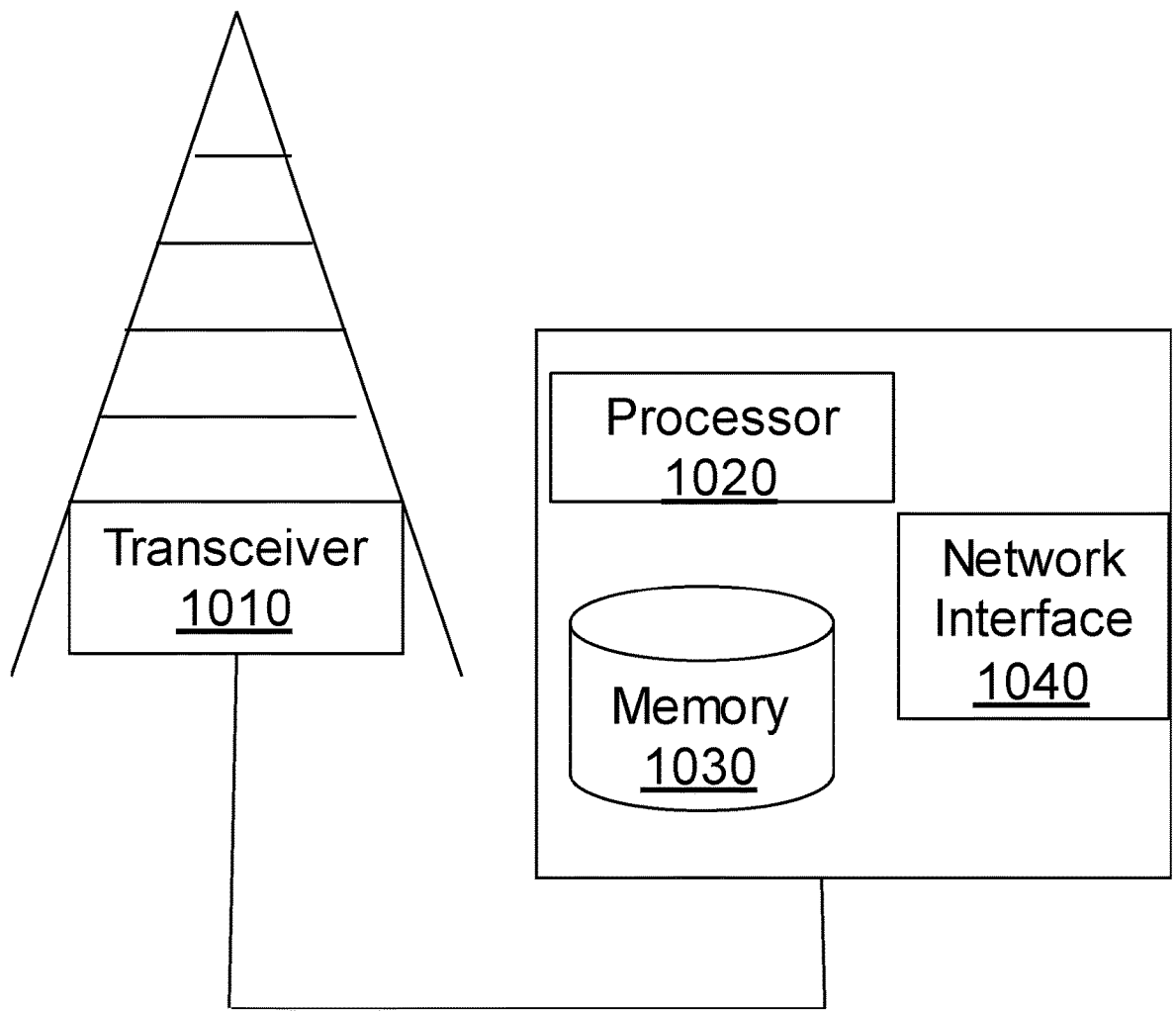
FIG. 10 is a block diagram illustrating an example embodiment of a network node.

FIG. 10 is a block diagram illustrating an example embodiment of a network node. The network node is an example of the network node 120 illustrated in FIG. 4. The network node is capable of granting transmission resources to a wireless device and receiving data transmissions from the wireless device.

Network node 120 can be an eNodeB, a nodeB, a base station, a wireless access point (e.g., a Wi-Fi access point), a low power node, a base transceiver station (BTS), a transmission point or node, a remote RF unit (RRU), a remote radio head (RRH), or other radio access node. Network node 120 includes at least one transceiver 1010, at least one processor 1020, at least one memory 1030, and at least one network interface 1040. Transceiver 1010 facilitates transmitting wireless signals to and receiving wireless signals from a wireless device, such as wireless devices 110 (e.g., via an antenna); processor 1020 executes instructions to provide some or all of the functionality described above as being provided by a network node 120; memory 1030 stores the instructions executed by processor 1020; and network interface 1040 communicates signals to backend network components, such as a gateway, switch, router, Internet, Public Switched Telephone Network (PSTN), controller, and/or other network nodes 120. Processor 1020 and memory 1030 can be of the same types as described with respect to processor 920 and memory 930 of FIG. 9A above.

In some embodiments, network interface 1040 is communicatively coupled to processor 1020 and refers to any suitable device operable to receive input for network node 120, send output from network node 120, perform suitable processing of the input or output or both, communicate to other devices, or any combination of the preceding. Network interface 1040 includes appropriate hardware (e.g., port, modem, network interface card, etc.) and software, including protocol conversion and data processing capabilities, to communicate through a network.

In particular embodiments, processor 1020 in communication with transceiver 1010 grants transmission resources to a wireless device and receives data transmissions from the wireless device.

Other embodiments of network node 120 include additional components (beyond those shown in FIG. 10) responsible for providing certain aspects of the network node's functionality, including any of the functionality described above and/or any additional functionality (including any functionality necessary to support the solution described above). The various different types of radio network nodes may include components having the same physical hardware but configured (e.g., via programming) to support different radio access technologies, or may represent partly or entirely different physical components.

Some embodiments of the disclosure may provide one or more technical advantages. As an example, particular embodiments optimize the requesting and granting of transmission resources based on a particular data transmission pattern. A relay wireless device may not need to request resource grants each time a data burst is received from a source wireless device. Thus, the time between the relay wireless device receiving data from the source wireless device and the relay wireless device transmitting the received data to the network may be reduced, which may increase data throughput. Some embodiments may benefit from some, none, or all of these advantages. Other technical advantages may be readily ascertained by one of ordinary skill in the art.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the claims below.

Abbreviations used in the preceding description include:
3GPP Third Generation Partnership Project
BTS Base Transceiver Station
D2D Device to Device
eNB eNodeB
LTE Long Term Evolution
MAC Medium Access Layer M2M Machine to Machine
MCS Modulation and Coding Scheme
MIMO Multi-Input Multi-Output
MTC Machine Type Communication
ProSe Proximity Services
PSCCH Physical Sidelink Control Channel
PSDCH Physical Sidelink Discovery Channel
PSSCH Physical Sidelink Channel
RAN Radio Access Network
RAT Radio Access Technology
RRC Radio Resource Control
RRH Remote Radio Head
RRU Remote Radio Unit
SA Scheduling assignment
SC Sidelink Control
UE User Equipment
VoIP Voice Over IP
WAN Wireless Access Network

The invention claimed is:

1. A method in a first wireless device of relaying data from a second wireless device to a wireless communication network, the method comprising:
obtaining data transmission pattern information associated with data to be relayed from the second wireless device to the wireless communication network wherein obtaining the data transmission pattern information comprises determining the data transmission pattern based on a service type or protocol associated with the data to be relayed wherein the transmission pattern information comprises periodicity information;
requesting resources from the wireless communication network according to the data transmission pattern information, wherein the requested resources covers a plurality of future transmissions based on the transmission pattern;
receiving an indication of resources from the wireless communication network;
receiving the data from the second wireless device; and
transmitting the data to the wireless communication network using the indicated resources.

2. The method of claim 1, wherein the data to be relayed comprises one or more data bursts and the data transmission pattern information further includes an amount of data associated with each of the one or more data bursts, and a number of the one or more data bursts.

3. The method of claim 1, wherein obtaining the data transmission pattern information comprises receiving the data transmission pattern information from the second wireless device.

4. The method of claim 1, wherein determining the data transmission pattern based on a service type or protocol associated with the data to be relayed comprises performing deep packet inspection.

5. The method of claim 1, wherein the determined service type or protocol associated with the data to be relayed comprises voice over internet protocol (VoIP).

6. The method of claim 1, wherein the determined service type or protocol associated with the data to be relayed comprises file transmission protocol (FTP) or hypertext transfer protocol (HTTP).

7. The method of claim 1, wherein obtaining the data transmission pattern information comprises determining the data transmission pattern based on a long term evolution (LTE) version supported by the second wireless device.

8. The method of claim 1, wherein the first wireless device comprises a proximity services (ProSe) relay device.

9. The method of claim 1, wherein the indicated resources comprise semi-persistently scheduled (SPS) resources.

10. A relay wireless device capable of relaying data from a source wireless device to a wireless communication network, the relay wireless device comprising a processor, a memory, and a power source, the processor operable to:
obtain data transmission pattern information associated with data to be relayed from the source wireless device to the wireless communication network wherein obtaining the data transmission pattern information comprises determining the data transmission pattern based on a service type or protocol associated with the data to be relayed wherein the transmission pattern information comprises periodicity information;
request resources from the wireless communication network according to the data transmission pattern information, wherein the requested resources covers a plurality of future transmissions based on the transmission pattern;
receive an indication of resources from the wireless communication network;
receive the data from the source wireless device; and
transmit the data to the wireless communication network using the indicated resources.

11. The relay wireless device of claim 10, wherein the data to be relayed comprises one or more data bursts and the data transmission pattern information further includes an amount of data associated with each of the one or more data bursts, and a number of the one or more data bursts.

12. The relay wireless device of claim 10, wherein the processor is operable to obtain the data transmission pattern information by receiving the data transmission pattern information from the source wireless device.

13. The relay wireless device of claim 10, wherein the processor is operable to perform deep packet inspection to determine the data transmission pattern.

14. The relay wireless device of claim 10, wherein the determined service type or protocol associated with the data to be relayed comprises voice over internet protocol (VoIP).

15. The relay wireless device of claim 10, wherein the determined service type or protocol associated with the data to be relayed comprises file transmission protocol (FTP) or hypertext transfer protocol (HTTP).

16. The relay wireless device of claim 10, wherein the processor is operable to obtain the data transmission pattern information based on a long term evolution (LTE) version supported by the source wireless device.

17. The relay wireless device of claim 10, wherein the relay wireless device comprises a proximity services (ProSe) relay device.

18. The relay wireless device of claim 10, wherein the indicated resources comprise semi-persistently scheduled (SPS) resources.

19. A relay user equipment (UE) capable of relaying data from a source UE to a wireless communication network, the relay UE comprising:
an antenna configured to send and receive wireless signals;
radio front-end circuitry connected to the antenna and to processing circuitry, and configured to condition signals communicated between the antenna and the processing circuitry;
the processing circuitry being configured to:
obtain data transmission pattern information associated with data to be relayed from the source UE to the wireless communication network wherein obtaining the data transmission pattern information comprises determining the data transmission pattern based on a service type or protocol associated with the data to be relayed wherein the transmission pattern information comprises periodicity information;

request resources from the wireless communication network according to the data transmission pattern information, wherein the requested resources covers a plurality of future transmissions based on the transmission pattern;

receive an indication of resources from the wireless communication network;

receive the data from the source UE; and transmit the data to the wireless communication network using the indicated resources;

an input interface connected to the processing circuitry and configured to allow input of information into the relay UE to be processed by the processing circuitry;

an output interface connected to the processing circuitry and configured to output information from the relay UE that has been processed by the processing circuitry; and a battery connected to the processing circuitry and configured to supply power to the relay UE.

* * * * *